United States Patent [19]

Kennedy et al.

[11] Patent Number: 4,818,257
[45] Date of Patent: Apr. 4, 1989

[54] FIBER BED SEPARATOR AND PROCESS FOR REMOVAL OF AEROSOLS FROM HIGH VELOCITY GAS WITHOUT RE-ENTRAINMENT

[75] Inventors: Eugene D. Kennedy, Maryland Heights; Donald R. McAlister, Ballwin; Albert E. Tung, Manchester, all of Mo.

[73] Assignee: Monsanto Company, St. Louis, Mo.

[21] Appl. No.: 44,938

[22] Filed: May 1; 1987

[51] Int. Cl.⁴ .............................................. B01D 46/00
[52] U.S. Cl. ......................................... 55/97; 55/487; 55/520; 55/525; 55/529; 55/498
[58] Field of Search .................... 55/97, 73, 259, 486, 55/487, 498, 183, 525, 185, 187, 529, 520

[56] References Cited

U.S. PATENT DOCUMENTS

| | | | |
|---|---|---|---|
| 2,190,886 | 2/1940 | Schaaf et al. | 55/525 |
| 2,327,184 | 8/1943 | Goodloe | 55/525 |
| 2,514,623 | 7/1950 | Brown | 55/525 |
| 2,990,032 | 6/1961 | Saudvig | 55/498 |
| 3,733,792 | 5/1973 | Taylor | 55/488 |
| 3,745,748 | 7/1973 | Goldfield et al. | 55/97 |
| 4,053,290 | 10/1977 | Chen et al. | 55/466 |
| 4,086,070 | 4/1978 | Argo et al. | 55/97 |
| 4,120,671 | 10/1978 | Steenmeyer | 55/498 |
| 4,144,040 | 3/1979 | Claes et al. | 55/97 |
| 4,155,727 | 5/1979 | Steinmeyer | 55/242 |
| 4,249,918 | 2/1981 | Argo et al. | 55/97 |
| 4,300,918 | 11/1981 | Cary | 55/97 |
| 4,336,043 | 6/1982 | Aonuma et al. | 55/483 |
| 4,409,064 | 10/1983 | Vora et al. | 55/185 |

OTHER PUBLICATIONS

"Wire Mesh Mist Eliminators", Otto H. York Co., Bulletin 631, Jun., 1963.
Perry, J. H., "Chemical Engineers Handbook", 4th ed., McGraw-Hill Book Co., 1963, pp. 23-28, 9, 12-53, 64-66.
Industrial Gas Gleaning, W. Strauss, pp. 275-282.
ACS Industries, Inc. Technical Bulletin Titled "MIS-Termesh".

Primary Examiner—Bernard Nozick
Attorney, Agent, or Firm—Senniger, Powers, Leavitt and Roedel

[57] ABSTRACT

A substantially cylindrical mist eliminator bed element for use in removal of liquid aerosols from a moving gas stream by flowing the gas stream through the element. The element comprises a first fiber bed for collection of aerosol particles, and a second fiber bed adjacent the first fiber bed for preventing reentrainment of liquid in the gas stream. The element is adapted to be oriented with respect to a substantially horizontal flow of aerosol containing gas so that adjacent surfaces of the fiber beds are substantially vertical, the first fiber bed being upstream of the second fiber bed with respect to the flow of gas. The first fiber bed comprises a bed of fibers having a mean diameter of at least about 10 microns packed to a substantially uniform bed voidage of 85% to 98%, the mean fiber diameter, bed voidage and distribution of fibers in the first bed being such as to provide for collection of the droplets of liquid aerosol from an aerosol containing gas. The second bed has a substantially uniform voidage of 95% to 99% and comprises a network of fibers having a mean fiber diameter of between 100 and about 450 microns, said network comprising a plurality of layers of generally planar knitted wire mesh material. The second fiber bed may be comprised of a plurality of discrete modular sections.

48 Claims, 6 Drawing Sheets

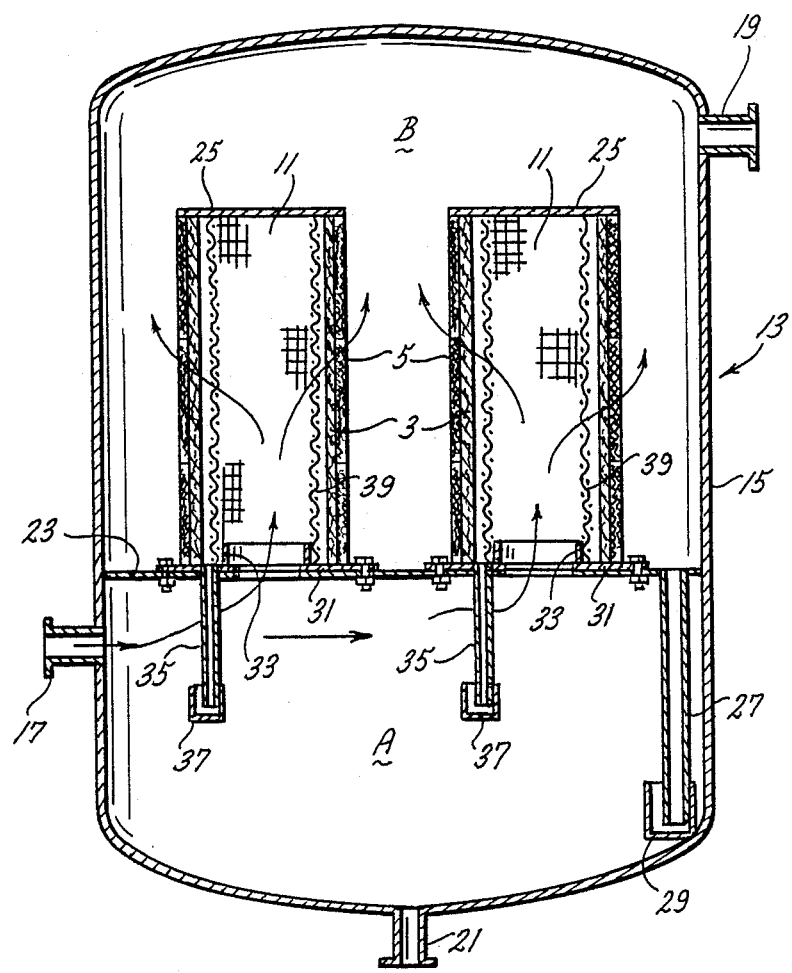

FIBER BED SEPARATOR AND PROCESS FOR REMOVAL OF AEROSOLS FROM HIGH VELOCITY GAS WITHOUT RE-ENTRAINMENT

BACKGROUND OF THE INVENTION

Fiber bed separators have found widespread use in applications wherein extremely fine aerosols of under 3 microns, and particularly under 1 micron, in particle size must be separated from a gas or vapor (hereinafter and in the claims collectively referred to as gas) stream. Fiber beds of up to 20 micron fibers have been found to remove sub-micron up to 3 micron sized aerosols with high collection efficiency, for example, as high as 98–99.9% efficiency. In applications requiring or permitting treatment of such aerosol containing gases at high bed velocities, such as for example 300 feet per minute (91.4 meters per minute) or more, larger diameter fibers have been used, e.g., about 25 to 50 microns, with some sacrifice in collection efficiency but even then efficiencies of 85 to 95% are attainable. Some of the more frequent applications include removal of acid mists, such as sulfuric acid mist, in acid manufacturing processes, plasticizer mists in, for example, polyvinyl chloride floor or wall covering manufacture, and water soluble solid aerosols such as, for example, emissions from ammonium nitrate prill towers. In removal of water soluble solid aerosols, the collected particulates are dissolved in a liquid within the fiber bed through use of an irrigated fiber bed or of a fogging spray of liquid such as water injected into the gas stream prior to the fiber bed.

Re-entrainment of collected liquid from the downstream surface of the fiber bed is often a problem with fiber bed separators. When the aerosol in the gas being treated is a mixture of particulates ranging in size from sub-micron to a few microns, the re-entrained particles normally have been coalesced in the fiber bed to a much larger average size. The large drops present a problem in that some supplemental removal must be performed downstream, but a much greater problem with re-entrainment is that a significant amount of sub-micron up to several micron in size particles are also formed which present a much more difficult downstream separation problem than do the larger droplet sized particles. In the past, this re-entrainment problem has been handled in a variety of ways.

A downstream impingement baffle can be used whereby the gas is caused to change its direction of flow by the baffle while re-entrained particles of heavier mass impinge on the baffle surface and drain down. This is adequate for removal of particles of great enough size and mass that their inertia will cause them to strike the baffle rather than continue to flow with the gas around the baffle. It does not effectively remove, however, the small particles below about 3 microns in size, which, because of their low mass, will tend to flow around the baffle and continue with the gas stream.

Argo et al. U.S. Pat. No. 4,086,070 describes a fiber bed separator containing a composite fiber bed element in which the first bed is comprised of relatively fine fibers and the second bed of relatively coarse fibers. Collection of the liquid droplets takes place primarily in the first fiber bed. By providing a second fiber bed of relatively coarse fibers in intimate fiber to fiber contact with the first bed, re-entrainment is substantially prevented and drainage of collected liquid is effected. In accordance with the disclosure of the Argo et al. patent, the first bed is selected such that the residual saturation of this fiber bed against gas phase drag of the liquid phase is less than the residual saturation of the first bed against gravity drainage of the liquid phase. Conversely, the second bed is selected such that the residual saturation of the second fiber bed against gas phase drag of the liquid phase is greater than the residual saturation of the second fiber bed against gravity drainage of the liquid phase. Accordingly, the collected liquid is forced by the gas flow through the first bed to the interface between the beds and then drains by gravity either from the interface or within the second bed.

The Argo et al. patent describes both high efficiency mist eliminators, which typically operate at bed velocities up to about 100 feet per minute and can provide collection efficiencies up to about 99.9%, and high velocity separators, which can operate at bed velocities of 300 to 500 feet per minute and provide collection efficiencies of 85-95%. In a high efficiency mist eliminator as described by Argo et al., the first bed typically consists of fibers having a mean diameter of 5-20 microns and has a bed voidage of 85-95% while the second bed consists of fibers having a mean diameter of 25-35 microns and has a bed voidage of 85-95%. In a high velocity mist eliminator as described by Argo et al., the first bed consists of fibers having a mean diameter of 25-75 microns while the second bed consists of fibers having a mean diameter of 30 to 300 microns. Argo et al. state that the fibers of the respective beds can be constituted of various materials, glass fibers being particularly preferred.

However, it has been learned that, where the fiber diameter required for re-entrainment control is larger than about 100 microns, the use of glass fibers may not be practically feasible. Where fibers of such size are utilized, it is difficult to produce a glass fiber bed which has the requisite voidage and mechanical stability. One alternative to glass fibers is metal mesh. However, for use in removal of sulfuric acid mists, where volumetric flow rates are high so that mist eliminators preferably operate at high velocity, the use of metal mesh fiber beds has not heretofore been considered practicable because of the relatively rapid rates of corrosion suffered by most metals when exposed to sulfuric acid solutions. Fibers having a mean diameter in the range desirable for the second bed of a high velocity mist eliminator are generally too large for suitable fabrication from glass, but are small enough so that even modest corrosion rates may render a metal mesh bed inoperative within a fairly short period of time.

It is feasible, and has become standard practice, to repack fiber bed mist eliminators when the mist eliminator bed deteriorates or clogs with solids. However, in the case of a composite bed high velocity mist eliminator, in which the first fiber bed element consists of glass fibers which may survive a very extended exposure to even highly corrosive environments such as sulfuric acid, it is economically undesirable to repack the entire bed if only one component thereof, for example, a re-entrainment section comprising metal mesh, deteriorates. Where repacking of one or more elements must be done frequently, problems may also result from the time and space limitations within a particular installation. Shutdown, removal, and replacement of mist eliminator elements is time consuming and may cause excessive downtime.

SUMMARY OF THE INVENTION

Among the several objects of the present invention, therefore, may be noted the provision of a fiber bed separator for treatment of aerosol containing gases without any substantial degree of re-entrainment at bed velocities which would otherwise result in re-entrainment; the provision of such a fiber bed separator which is particularly adapted for high velocity operations; the provision of such a fiber bed separator which is adapted for removal of corrosive aerosols such as sulfuric acid; the provision of such a fiber bed separator which has readily replaceable components; the provision of such a separator in which the fiber bed mist eliminator elements may have components replaced without removal of the elements from the separator vessel; the provision of such a fiber bed separator in which one component of a two component fiber bed can be replaced without disturbing the other component; the provision of a novel fiber bed element for such a fiber separator; and the provision of a novel process for removing aerosols from an aerosol containing gas at high velocity.

The present invention is directed to a mist eliminator bed element for use in the removal of liquid aerosols from a moving gas stream by flowing the gas stream through the element. The element comprises a first fiber bed for collection of aerosol particles, and a second fiber bed adjacent the first fiber bed for preventing re-entrainment of collected liquid aerosol into the gas stream. The element is adapted to be oriented with respect to a substantially horizontal flow of aerosol containing gas so that adjacent surfaces of said fiber beds are substantially vertical, the first fiber bed being upstream of the second fiber bed. The first fiber bed comprises a bed of fibers having a mean fiber diameter of at least about 10 microns packed to a substantially uniform bed voidage of 85–95%, the mean fiber diameter, bed voidage and distribution of fibers in the first bed being such as to provide for collection of the droplets of liquid aerosol from an aerosol containing gas, a horizontal component of movement of collected liquid through said first fiber bed toward its downstream surface consequently being imparted by gas phase drag at a design gas velocity. The second fiber bed has a substantially uniform bed voidage of 95%–99% and comprises a network of fibers having a mean fiber diameter of between about 100 and about 450 microns. The fibers of the network are mechanically stable and substantially rigid under the mechanical forces imposed by the structure and operation of a mist eliminator in which the element is used for the removal of aerosols from gases at high velocity. The fiber diameter and voidage of the second bed are such that liquid collected from the aerosol in the first fiber bed substantially drains from the second fiber bed without substantial re-entrainment.

The invention is further directed to a mist eliminator element of the aforesaid type in which the fibers of the first bed are randomly distributed.

The invention is further directed to a fiber bed separator for removal of aerosols from a moving gas stream as a liquid phase without substantial re-entrainment of the collected liquid phase. The fiber bed separator comprises inlet means for an aerosol containing gas, at least one fiber bed element, outlet means for the collected liquid phase, outlet means for the treated gas stream, and baffle means forcing the aerosol containing gas stream to pass through each of the fiber bed elements. Each fiber bed element comprises a first fiber bed and second fiber bed of the type described above.

The invention is further directed to such fiber bed separator in which the fibers of the first bed are randomly distributed.

Further included in the invention is a mist eliminator bed element for use in removal of liquid aerosols from a moving gas stream by flowing the gas stream through the element. The element comprises a first fiber bed for collection of aerosol particles, and a second fiber adjacent the first fiber bed for preventing re-entrainment of collected liquid in the gas stream. The element is adapted to be oriented with respect to a substantially horizontal flow of aerosol containing gas so that adjacent surfaces of the fiber bed are substantially vertical, the first fiber bed being upstream of the second fiber bed. The first fiber bed comprises a bed of fibers having a mean fiber diameter of at least about 10 microns packed to a substantially uniform bed voidage of 85%–95%, the mean fiber diameter, bed voidage, and distribution of fibers in the first bed being such as to provide for collection of the droplets of liquid aerosol from an aerosol containing gas, a horizontal component of movement of collected liquid through the first fiber bed towards the downstream surface of the first fiber bed consequently being imparted by gas phase drag at a design gas velocity. The second fiber bed comprises a non-matting bed of fibers having a mean fiber diameter of at least about 25 microns packed to a bed voidage from about 85%–99%, the fiber diameter and voidage of the second bed being such that the liquid collected from the aerosol in the first fiber bed substantially drains by gravity from the second fiber bed without substantial re-entrainment. The second fiber bed is comprised of a plurality of discrete sections that are fitted together to form a bed of substantially uniform voidage. The invention is further directed to a fiber bed separator having at least one element of the aforesaid type and otherwise having the construction described above.

The invention is also directed to an improved process for removing aerosols of less than 3 microns from a moving gas stream in a fiber bed separator wherein the aerosol containing gas is caused to flow substantially horizontally through a bed of fibers having a mean diameter of at least about 10 microns and packed to a substantially uniform bed voidage from 85–99% resulting in separation of a substantial proportion of the aerosol from the gas as a collected liquid phase. In accordance with the improvement, a second fiber bed is provided adjacent the first fiber bed, adjacent surfaces of said beds being substantially vertical. Aerosol containing gas is caused to flow substantially horizontally through the first fiber bed at a velocity which effects collection of the liquid aerosol, consequently imparting a horizontal component of movement of collected liquid through the first fiber bed towards its downstream surface due to gas phase drag. The substantially horizontal flow of gas, now substantially free of aerosol particles, is continued through the second fiber bed, the second fiber bed having a substantially uniform bed voidage of 95–99% and comprising a substantially rigid network of fibers having a mean fiber diameter between about 100 and about 450 microns, the fibers of the network being mechanically stable and substantially rigid under the mechanical forces imposed by the structure of the mist eliminator and operation thereof for removing aerosols from gases at high velocity. The fiber diameter and voidage of the second bed are such that liquid collected from the aerosol in the first fiber bed substantially drains from the second fiber bed without substantial re-entrainment.

Other objects and features will be in part apparent and in part pointed out hereinafter.

BRIEF DESCRIPTION OF THE DRAWINGS

FIG. 2 is a cross-sectional view of a fiber bed mist eliminator representing a preferred embodiment of the invention;

Corresponding reference characters indicate corresponding parts in the several views of the drawings.

DESCRIPTION OF THE PREFERRED EMBODIMENTS

In accordance with the present invention, it has been discovered that effective re-entrainment control can be realized in a high velocity composite bed mist eliminator by use of a second bed which has a very high bed voidage and is comprised of a network of fibers that are mechanically stable and substantially rigid under the mechanical forces imposed by the structure and operation of the mist eliminator. More particularly, it has been found that a novel mist eliminator element, including a knit of strong, rigid fibers, can be provided for use in removing highly corrosive mists such as, for example, the sulfuric acid mists encountered in sulfuric acid plant process streams. In the context of this disclosure, it will be understood that forces imposed by the structure itself relate to the structural stresses caused by the weight of the structure and the containment forces required to provide the mist eliminator bed element configuration necessary for advantageous process operation. Operational forces include those created by fluid friction, liquid gravity loading, and aerosol impact on the mist eliminator element. By "mechanically stable" is meant having sufficient rigidity and strength to resist breakage, deformation, or fiber shifting under the mechanical load conditions.

Figure 1:
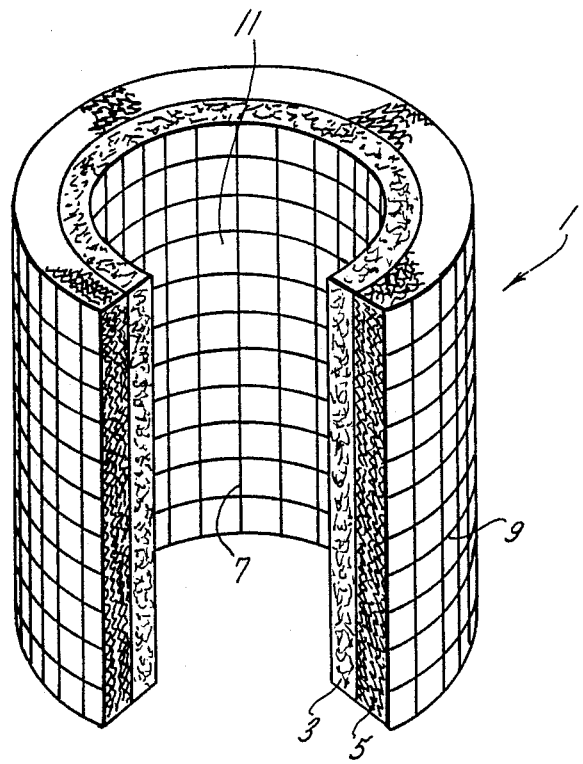
FIG. 1 is a perspective view partially cut away of a cylindrical composite fiber bed element comprising a preferred embodiment of the invention.

Illustrated in FIG. 1 is a preferred composite fiber bed mist eliminator element of the invention. The element 1 is cylindrical and comprises a first fiber bed 3 of tubular configuration, concentric with the cylindrical axis. A second fiber bed 5, also tubular in configuration, is arranged concentrically with bed 3 with adjacent surfaces of the two beds substantially parallel. Preferably, the second bed is in contact with the first so that an interface is provided between the two beds. Alternatively, there may be a short void between the two beds, or there may be a space filled with a relatively coarse material such as a coarse mat or expanded metal.

In the preferred embodiment of FIG. 1, fiber beds 3 and 5 are confined between a pair of cylindrical screens 7 and 9 which maintain the fiber material in a dimensionally and mechanically stable configuration, and help maintain contact between the beds 3 and 5. In assembly of the mist eliminator element, the fiber material of one or the other bed may be provided on a backing of netting or scrim which is interposed between the beds in the asembled element. Provided that the scrim has a relatively open mesh, it does not interfere with contact between the two beds.

In operation, the mist eliminator element is oriented with respect to a substantially horizontal flow of aerosol containing gas so that the interface is in a substantially vertical position, the first bed being upstream and the second downstream of the interface. Inside the annular fiber beds is a passage 11 along the axis of the element for introduction and flow of an aerosol containing gas. The gas is introduced at one end of this passage, typically the lower end when the element is in service in a vertical position, and the upper end is closed off, for example, by means of a blank flange, to force the gas to pass substantially horizontally through the mist eliminator element. Aerosol liquid droplets are collected primarily in the first fiber bed 3, and the collected liquid is drained by gravity via the second fiber bed 5.

Generally, the installation of fiber bed elements in separating equipment is well known in the art. For example, as indicated above, cylindrical elements are normally constructed using rigid screens suitably affixed one to the other in rigid annular relationship, with fiber beds packed in between the screens. One end of the element is closed against gas flow by a blank flange and the other open end is mounted in a tube sheet with suitable flanges. Normally, a plurality of elements is similarly mounted in the tube sheet. Depending on the desired direction of gas flow, the elements may be installed in the vessel either suspended from the tube sheet or supported on the tube sheet. Gas inlet means are provided to the vessel on the upstream side of the tube sheet and gas outlet means are provided on the downstream side of the tube sheet. With various permutations, the gas may be caused to flow either from the outer circumference of each element inwardly to the core thereof, or as shown in FIG. 2, from the core of the element outwardly to the outer circumference thereof. Whichever gas flow direction is chosen, the first fiber bed is disposed in the upstream side of the second fiber bed.

In the embodiment illustrated in FIG. 2, a fiber bed separator 13 is shown as comprising a vessel 15 provided with gas inlet and outlet means 17 and 19, respectively, a bottom discharge nozzle 21, and a plurality of cylindrical elements 1 supported in a vertical position on a horizontal tube sheet 23. Thus, the tube sheet comprises baffle means which, together with the cylindrical elements, divide the separator into an upstream zone A and the downstream zone B. The upper end of each element 1 is closed off by a plate or blank flange 25 which prevents the gas from bypassing the fiber bed elements. A drain leg 27 is provided for drainage of accumulated liquid from the tube sheet via a seal cup 29 that is conveniently tack welded to the drain leg.

Each element 1 comprises a support flange 31 which is typically bolted to tube sheet 23. As illustrated in FIG. 2, flange 31 extends inwardly of fiber bed 3 and includes a collar 33 for containing liquid that may collect and drain off the inner face of element 3. A drain leg 35 depending from flange 31 provides for removal of such collected liquid via a seal cup 37 tack welded to the drain leg.

A baffle screen pre-separator 39 concentric with, disposed within, and radially spaced from bed 3, is provided for interception and removal of a portion of the mist from a heavily mist-laden gas stream. Conveniently, baffle screen 39 may be supported on flange 31 in the annular space between fiber bed 3 and collar 33.

In operation of the embodiment shown in FIG. 2, aerosol containing gas enters zone A of vessel 13 through inlet 17. Since the upper end of each element 1 is sealed by plate 25, the gas is forced through the first fiber bed 3 and the second fiber bed 5 as shown by the arrows. The gas, now substantially free of aerosol and without re-entrained liquid, exits through nozzle 19, and liquid aerosol which collects on the tube sheet is discharged from the vessel through drain leg 35 and bottom outlet 21. Typically, a portion of the aerosol separates from the gas due to reduction in gas velocity within zone A below tube sheet 23, and by impingement on the bottom of the tube sheet.

The mean fiber diameter, bed voidage, and the distribution of fibers in the first fiber bed 3 are such as to provide for collection of the droplets of liquid aerosol from an aerosol containing gas, preferably without matting of the bed, at a design gas velocity. These parameters of the first bed are such that gas phase drag almost unavoidably imparts a horizontal component of movement of collected liquid through the first fiber bed towards the interface at the design gas velocity. Typically, the first fiber bed has a voidage of 85–98% and is comprised of fibers having a mean diameter of 10–50 microns. For most high velocity applications, the mean diameter of the fibers of the first bed is in the range of about $20\mu$ to about $40\mu$. It is generally preferred that the fibers of the first bed be arranged randomly, i.e., so that the fibers extend in a variety of directions, especially in a plane normal to the flow of aerosol containing gas through the bed. Such random distribution contributes to the efficient collection of aerosol droplets from the gas. In most applications, the depth or thickness of the first fiber bed need only be such as to provide enough fibers in the path of the aerosol droplet to assure high efficiency collection of the aerosol. This is typically accomplished with a thickness of about two inches or less, though for practical purposes it may be desirable to provide a thickness of 4 inches or more to compensate for any slight weaknesses or inhomogeneities in the bed.

The fibers of the first bed should not absorb the aerosol liquid to any substantial degree. Suitable fibers may be constituted of a variety of different materials, including metals such as stainless steel, titanium, etc.; polymeric materials such as polyesters, polyvinyl chloride, polyethylene terephthalate, fluorocarbons such as Teflon, nylons, polyalkylenes such as polyethylene and polypropylene etc. and glass. Glass fibers have found particularly widespread use in fiber bed separators and are preferred for use in the first fiber bed in the practice of this invention. Suitable glass fibers and fiber beds include both coated and uncoated or untreated glass fibers. Glass fibers coated with a material providing lyophobic properties, and particularly the silicone coated hydrophobic glass fibers taught in U.S. Pat. No. 3,107,986, may be used. However, in an especially preferred embodiment of the invention, untreated lyophilic, and particularly hydrophilic, glass fibers are used. Especially useful glass fibers are long staple glass fibers in diameters up to about 40 microns, and 25 micron or greatly curly glass fibers, all of which provide fiber beds of excellent mechanical stability at the low packing densities used to obtain the desired bed voidage. If desired, such fiber beds can be heat treated to relieve stresses from packing or forming the bed and to provide additional mechanical stability.

This invention is not limited in the form of fibers used in the first fiber bed. Thus, for example, the first bed may be formed using bulk fibers, sheets or mats of fibers, fiber roving, etc. For example, a single mat of fibers may be compressed to the desired packing density or plurality of sheets of like fibers may be layered to form the fiber bed. In other embodiments, for example, a long continuous sheet of fibers or long continuous fiber roving may be spirally wound around a cylindrical foraminous core. In such embodiments, proper tension during winding can be used to provide the desired bed voidage.

To provide effective reentrainment control and drainage of collected aerosol liquid, it has been discovered that the second bed should have a very high voidage, preferably in the range of 95–99%, and that the fibers of the second bed preferably have a mean diameter of between about 100 and about 450 microns. The fibers of the second bed may be constituted of any of a variety of materials which are mechanically stable and substantially rigid under the forces imposed by the structure and operation of a fiber bed separator in which the bed element is incorporated. It will be understood that, in the context of the present invention, the term "fiber" encompasses any thread, strand, or filament of any suitable material, including metal wire. Metal fibers are, in fact, preferred. It is particularly preferred that the second fiber bed be constructed of a knitted or woven wire mesh material, since this type of structure not only is suitable for effective control of re-entrainment, but also is especially effective for causing drainage of collected aerosol liquid from the mist eliminator element. A special advantage is believed to be provided by the relatively long individual wires contained in a knitted mesh, since the liquid tends to drain smoothly along those of the wires which are oriented in a vertical direction, or which have a substantial vertical component of orientation.

Figure 3:
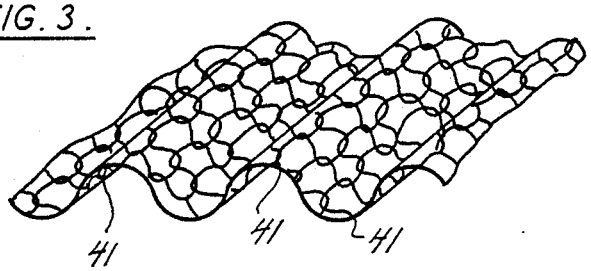
FIG. 3 is a perspective view of a knitted mesh material useful in the second fiber bed element of the mist eliminator of the invention.

A preferred configuration of knitted mesh material is illustrated in FIG. 3. This mesh is comprised of an omega type knit of metal wire. As knitted, the mesh is substantially planar, but the knit is preferably crimped, for example, by passing it between a pair of fluted rollers, to produce substantially parallel corrugations or ridges 41 extending from the general plane of the knit. In producing the second fiber bed, a web of this material is wound in a circumferential spiral about the axis of the cylindrical element. This produces a plurality of wraps or layers of the knitted material through which the gas stream passes, the direction of gas flow being transverse to the plane of the knit. The ridges 41 in the knitted mesh material create space between successive wraps, with the result that the voidage of the bed exceeds that of the knitted mesh material per se.

Figure 4:
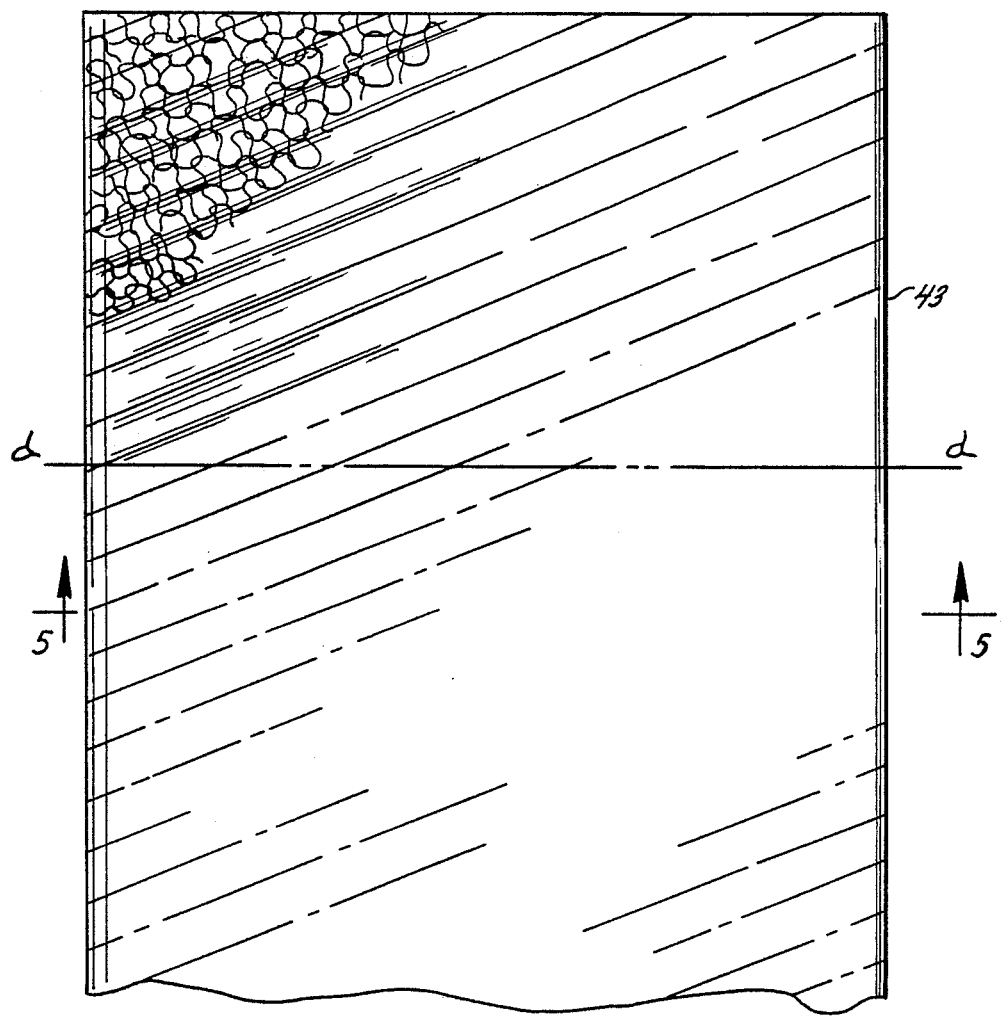
FIG. 4 is a schematic plan view of a tube of knitted metal mesh material that has been flattened along a diameter thereof and crimped to provided ridges in the knit.
Figure 5:
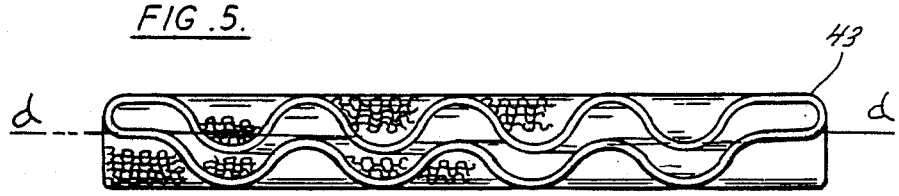
FIG. 5 is a schematic section along the line 5—5 in FIG. 4.
Figure 6:
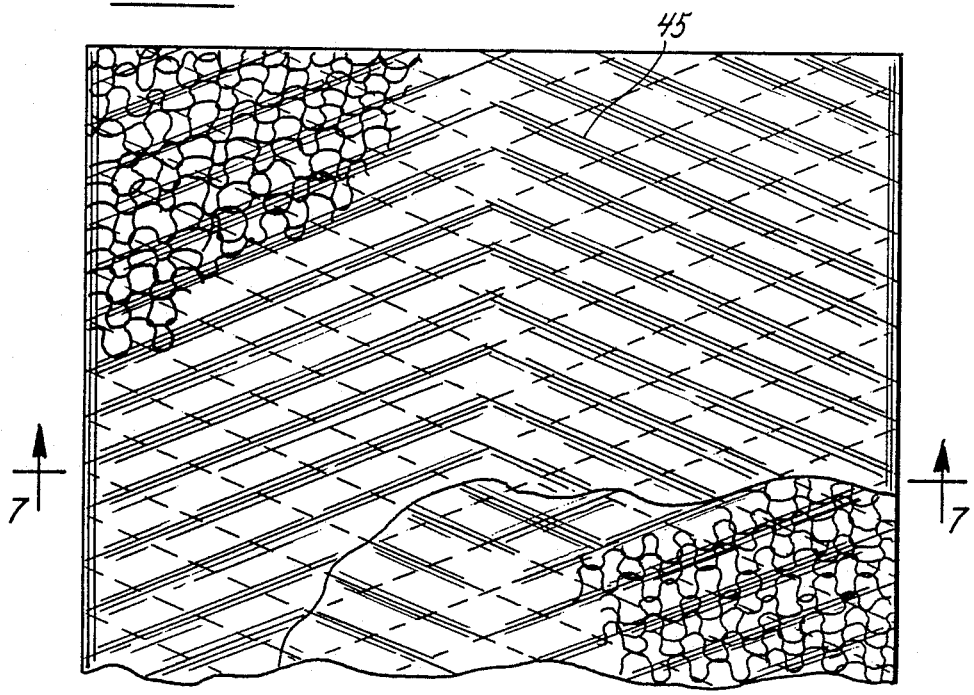
FIG. 6 is a schematic view of a the tube of FIGS. 4 and 5 after it has been reflattened along a diameter 90° removed from the diameter on which it was flattened during the crimping operation, a portion of the upper side of the flattened tube being torn away to show the reverse herringbone pattern produced in the lower side of the tube.
Figure 7:
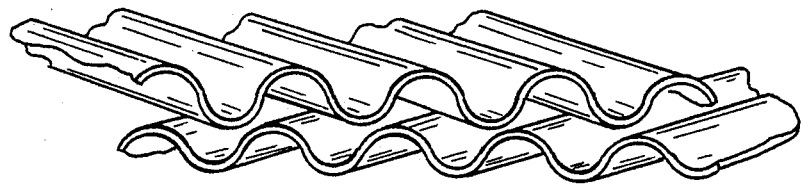
FIG. 7 is a schematic sectional view along the line 7—7 of FIG. 6 showing the additional voidage created in the mesh material by crimping the flattened tube of material and reflattening it along a line 90° removed from the original diameter of flattening.
Figure 9:
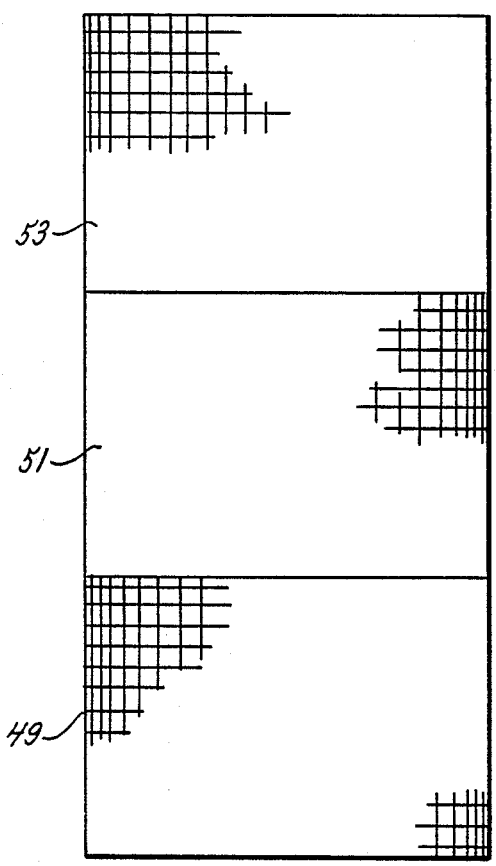
FIG. 9 is an elevation of a composite bed mist eliminator element of the invention in which the outer component of the composite bed is constituted of discrete modular cylindrical elements.
Figure 10:
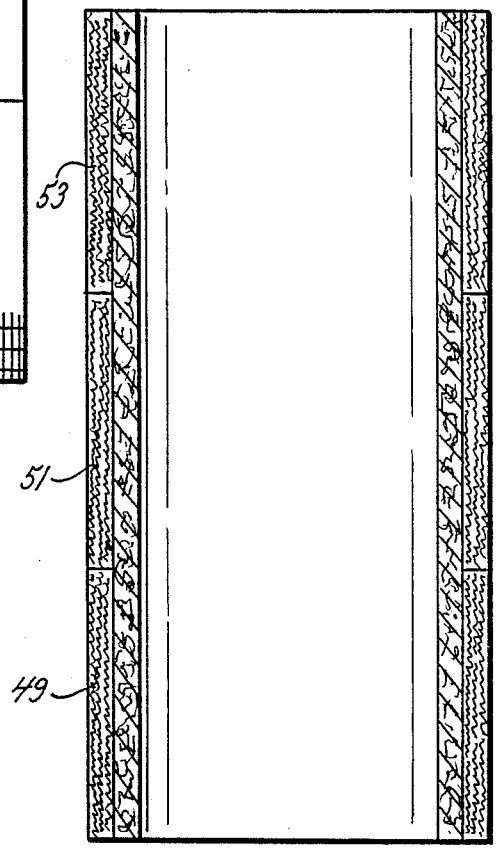
FIG. 10 is a sectional view of the element of FIG. 8.
Figure 8:
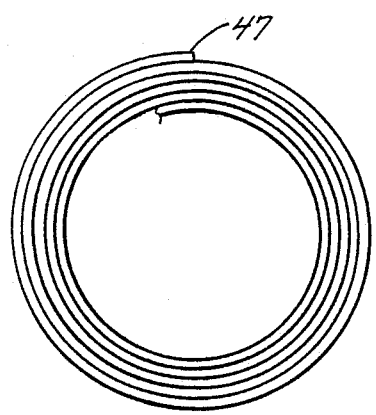
FIG. 8 is an end or top view of the second fiber bed, showing the preferred circumferential and spiral winding of a web of knitted mesh material.

In one preferred embodiment of the invention, as illustrated in FIGS. 4 to 8, the second fiber bed is produced from a double thickness of knitted material, the double thickness being provided by initially knitting the metal wire in the form of a tube 43, and then flattening the tube. As shown in FIGS. 4 and 5, the tube 43 is preferably crimped at an angle to its circumference. This allows the second fiber bed to be produced in such a fashion that the ridges in one wrap of the knitted material extend in a direction which is biased with respect to the direction in which the ridges of a successive wrap extend. Thus, as shown in FIG. 4, the tube 43 is first flattened along a diameter d, then crimped at an angle of, for example, 45 degrees to that diameter. Thereafter the tube is reopened, then reflattened along a diameter which is essentially 90 degrees removed from the first diameter (d). As shown in FIGS. 6 and 7, this produces a herringbone pattern 45 in each side of the flattened tube, the herringbone pattern in one side having an orientation which is the reverse of the pattern in the other side of the tube. Such configuration causes the ridges 41 in one side of the tube to bear on those of the other side, which increases the spacing between adjacent layers of knitted material. This not only contributes to the overall voidage of the second fiber bed, but also provides drainage channels for removal of collected liquid aerosol from the second fiber bed.

Preferably, the knitted material of the second fiber bed has a ridge (or crimp) height in the range of between about 0.1 and about 0.5 inches. Wire from which mesh is knitted typically has a diameter of between 0.005" and 0.016", with a diameter of between 0.008" and 0.012" being generally the most suitable. The crimp is preferably controlled at a height in the above mentioned range such that, using the reverse herringbone pattern also described above, the knitted mesh may be packed to a voidage of 99% (resulting in a bulk density of 5 lbs/ft$^3$ for a material, such as stainless steel, having a fiber density of about 500 #/ft$^3$) to 97.5% (a bulk density of 12 lbs./ft$^3$ for a similar material). To provide the desired thickness of the second fiber bed, approximately ten to twelve wraps of this double thickness material are used.

FIG. 8 is an end (or overhead) view of the second fiber bed, showing a web 47 of double thickness knitted mesh material wound spirally in a circumferential direction. To provide the desired thickness of the second fiber bed, typically 5 to 15 wraps, preferably 10–12 wraps, of 0.1 to 0.5 in crimp height material may be advantageously used. Alternatively, double the aforesaid number of wraps of single thickness knitted mesh may be used. Although the reverse herringbone effect is not thereby achieved, use of a single thickness facilitates manufacture of commercial elements and is in this respect preferred. Statistically, sufficient offset of ribs of successive wraps is realized to achieve the bed voidage desired.

Effective, practicable, and economical removal of corrosive aerosols from high velocity process streams is facilitated by the use of selected corrosion resistant metals for the material of construction of the wire mesh network of the second fiber bed, and further by the provision of the second fiber bed in discrete modular sections. It has been found that certain materials, most particularly type 310 stainless steel, Alloy 20 (e.g., Carpenter 20), and Sandvik SX sulfuric acid alloy are uniquely resistant to the sulfuric acid compositions which typically comprise sulfuric acid mists, so that knitted or woven wire mist eliminator beds survive a reasonable and substantial period of operation in such service before they must be replaced. Generally, each of the fiber beds is constructed of a material which exhibits a corrosion rate of no greater than about 2 mils per year.

As indicated in FIG. 2, there is limited room inside the fiber separator vessel for repacking of the mist eliminator elements. Accordingly, it has been conventional practice to entirely remove the elements from the vessel in order to repack them. While this practice is acceptable where the life of the packing is very extended, the downtime associated with removal of the elements may be prohibitively expensive in applications such as, for example, sulfuric acid plants, where corrosion of a metal fiber bed may require repacking at relatively frequent intervals. Because of the high volume, capital intensive character of contact sulfuric acid manufacturing facilities, downtime is at an especial premium in such facilities.

However, in accordance with the present invention, when replacement of the second bed does become necessary due to advanced corrosion, the preferred modular construction of the second fiber bed makes it feasible to effect repacking of the mist eliminator without the necessity of removing the element from the mist eliminator vessel. This is illustrated in FIGS. 9 and 10. These drawings show a substantially cylindrical mist eliminator element in which the second fiber bed 5 is on the outside of the cylinder, the fiber bed (visible in FIG. 10 but not FIG. 9) being inside of and concentric with the second bed. In the particular embodiment shown in these drawing, the second bed comprises three discrete arcuate sections 49, 51 and 53, each tubular in form, which are fitted together by stacking one on top of another. The three sections are of substantially uniform voidage and are fitted together as tightly as possible, thus serving as essentially one integral fiber bed unit.

It will be seen that this modular construction facilitates both installation and removal of the second fiber bed. More particularly, it allows deteriorated modular units to be removed while the element is still inside the fiber separator vessel, and a new modular second fiber bed to be installed without removal of the element from the vessel. This provides major advantages in enabling the operator of the process to replace deteriorated fiber beds without the necessity of excessive downtime.

It will be recognized that the benefits to be realized from the construction of FIGS. 9 and 10 are not limited to high velocity type composite mist eliminators. Wherever the second fiber bed of a composite mist eliminator is constructed of a fiber material which can be provided in the desired modular form, this feature of the present invention may be utilized to facilitate on site repacking of individual mist eliminator elements. Accordingly, the mean fiber diameter and bed voidage of such modular sections can be varied rather widely. Generally such modular sections can be produced at bed voidages of 85-99% and of fibers having a mean diameter of 25 microns or greater.

In accordance with the improved process of the invention, an aerosol containing gas is caused to flow substantially horizontally through a mist eliminator element of the type described hereinabove. Such element is comprised of a bed of fibers having a mean diameter of at least about 10 microns and packed to a substantially uniform bed voidage from about 85% to about 99%. Passage of the aerosol-laden gas stream through the element results in the separation of a substantial proportion of the aerosol from the gas as a collected liquid phase. In accordance with the improvement of the present invention, a second bed is provided for re-entrainment control, the second bed having the characteristics described hereinabove. The gas is caused to flow through the first fiber bed at a velocity which effects collection of the liquid aerosol. Achievement of efficient collection normally, in fact essentially always, requires a gas velocity high enough to impart a horizontal component of movement of collected liquid through the fiber fiber bed towards the downstream surface of the bed, and the interface between the beds, due to gas phase drag. The substantially horizontal flow of the gas, now substantially free of aerosol particles, is continued through the second bed, the second bed as noted having a substantially uniform bed voidage of 95% to 99% and comprising a network of substantially rigid fibers having a mean fiber diameter between about 100 and about 450 microns.

In a high velocity operation, the gas flow rate may range from 200 to 700, more typically 300 to 500 feet per minute. Under such high velocity conditions, it has been found that the process of the invention provides for highly efficient removal of liquid aerosol with substantially no generation of re-entrained droplets having particle sizes greater than 3 microns.

Where there is a substantial horizontal component of flow of the liquid contained in the first fiber bed, the mean fiber diameter and bed voidage of the first bed are typically such that, at the design gas velocity and aerosol loading, the residual saturation of the first bed against gas phase drag of the liquid phase ($R_v$) is less than the residual saturation of the first fiber bed against gravity drainage of the liquid phase ($R_g$). Preferably, the mean fiber diameter and voidage of the second fiber bed are such that the residual saturation of the second fiber bed against gas phase drag of the liquid phase ($R_v$) is greater than the residual saturation of the second fiber bed against gravity drainage of the liquid phase ($R_g$).

Residual saturation is the maximum quantity of a given liquid which a given fiber bed will hold under given conditions without migration of the liquid from the fiber bed other by evaporation. It varies with the nature of the liquid, the nature of the fiber, the fiber diameter, the bed packing density (or void fraction), and also varies in magnitude depending upon the condition under which it is measured. Residual saturation under each condition (or force) may be visualized as that maximum loading of liquid in the fiber bed at which the force applied to the liquid (i.e., gas phase drag in the one case, and gravity in the other case) just balances the resistive forces holding the liquid in the fiber bed. Although theoretically it might appear that $R_v$ could never be greater than $R_g$, Argo et al. in U.S. Pat. No. 4,086,070 demonstrated and provided test methods affording an empirical method of determining $R_v$ while preventing gravity drainage from the test bed.

Residual saturation should not be confused with a blooded or full fiber bed wherein the collected liquid substantially completely fills the void spaces between the fibers in the bed or in the flooded portion of a bed. The residual saturation in the fiber bed separators of the invention occurs at a liquid loading well below the flood stage and is more a function of capillary action and surface tension rather than a filling of the available void space in the bed.

Under the design flow conditions in certain embodiments of the present invention, after an operating equilibrium has been established, the liquid hold-up in the first fiber bed (expressed for example as weight of liquid per unit weight of fiber in the bed or if desired per unit bed volume) is insufficient to cause drainage from the first fiber bed by gravity but is sufficient to allow gas phase drag to carry the collected liquid to the downstream surface of the first fiber bed. This necessarily results in a substantial horizontal component of flow in the fiber bed. As used herein, bed operating equilibrium refers to the steady state condition achieved during actual collection of the aerosol where the quantity of aerosol entering the fiber bed is equal to the quantity of collected liquid leaving that fiber bed.

In the second fiber bed, the function of which is to substantially prevent re-entrainment of the collected liquid from the downstream surface of the first fiber bed, the relationship between residual saturation against gas phase drag and residual saturation against gravity drainage is exactly reversed as compared to the relationship that prevails in the first fiber bed. In the second bed, since the resistive forces against gravity drainage are lower than the resistive forces against gas phase drag, the liquid drains by gravity flow.

Determination of residual saturation against gas phase drag and residual saturation against gravity drainage may be made by the method described in Argo et al., U.S. Pat. No. 4,086,070, column 4, line 65 through column 8, line 11, which passage is expressly incorporated herein by reference.

Preferably the gas velocity and liquid loading on the mist eliminator element is not so high as to result in flooding. However, among the advantages of the mist eliminator and process of the invention is a degree of tolerance for flooding and a capability for controlling re-entrainment even under flooding or incipient flooding conditions.

The following examples illustrate the invention.

EXAMPLE 1

A pilot scale cylindrical mist eliminator element was prepared having an inside diameter of 10", an outside diameter of 12", and a height of 13". The cylindrical element was comprised of a first fiber bed of tubular configuration and constituted of nominally 22 micron (A-mat) glass fibers surrounded by a second fiber bed, also of tubular configuration, and comprised of knitted metal wire mesh material. The metal mesh material was spirally wound in a circumferential direction ("jelly-rolled") to a thickness to about 1¾". The thickness of the first fiber bed was approximately 1". Both the A-mat and wire mesh pad fiber beds were enclosed with a 1½"×1½" metal wire grid to provide bed stability.

The cylindrical mist eliminator element was installed in a vertical position supported on a horizontal tube sheet above an enclosed tank housing an air/water mixing nozzle. A cylindrical plexiglass shroud having a diameter of approximately 19¼" was placed around and oriented concentrically with the cylindrical pilot mist eliminator scale element. Thus, an annular gap of 3¾" was provided between the outer (downstream) surface of the mist eliminator element and the inside surface of the shroud, thereby simulating the annular downstream flow conditions of a fiber bed separator.

A 15 horsepower blower was provided for supplying air through a humidifying chamber upstream of the principal mist generating spray nozzle. This blower supplied air sufficient to maintain a velocity of 500' per minute through the bed of the test element. The spray nozzle was operated to provide a mist loading in the air flow which was computed from tube sheet drainage as within the range of 500 to 650 milligram per actual cubic foot of air. To facilitate measurement of mist loading by means of an Anderson impactor, a recirculating 10% $Na_2SO_4$ solution was used for mist generation. Velocity of the air stream in the annular gap between the exterior of the mist eliminator element and the inside of the shroud was approximately 750–1,000 feet per minute.

With the system in operation, measurement were made to determine the mist loading both of particles greater than 3 microns and those smaller than 3 microns downstream of the pilot mist eliminator element. A series of tests were run using fiber beds comprised of different sources and densities of knitted metal wire mesh material. In one series of runs, the material was packed to density of 6 pounds per cubic foot while in another series it was packed to a density of 12 pounds per cubic foot. For purposes of comparison a number of runs were made in which the second fiber bed element was omitted. Comparison of the results of the latter runs with those in which the second fiber bed was included made it possible to determine the effect of the second fiber bed in controlling re-entrainment.

Figure 11:
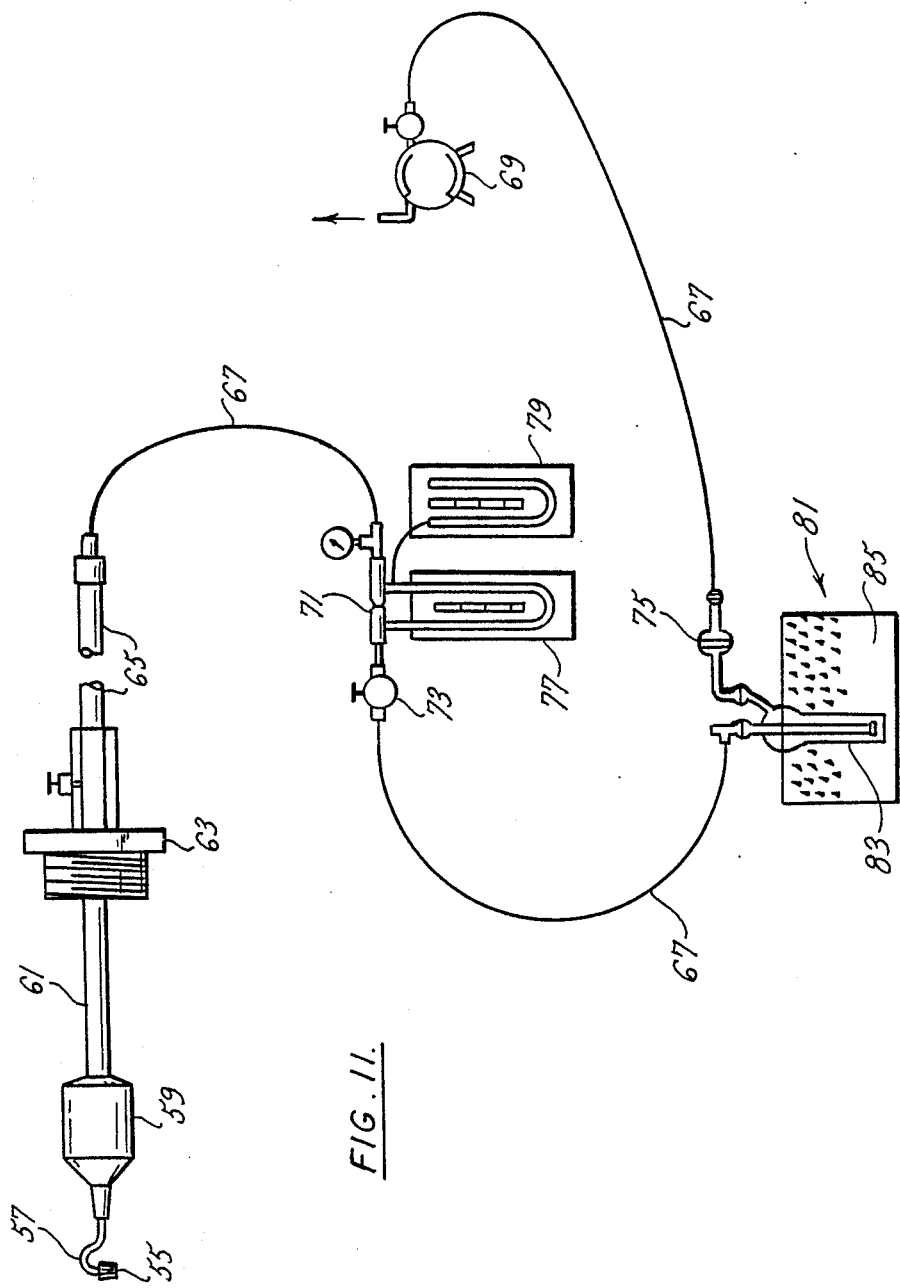
FIG. 11 is a schematic illustration of an apparatus used in sampling aerosols in the course of testing the mist eliminator, separator and process of the invention.

Illustrated in FIG. 11 is an apparatus used to determine mist loading the aerosol particle size distribution in the gas downstream of the mist eliminator element. This apparatus includes a sampling nozzle 55 on the end of a gooseneck probe 57. Mist collected by the nozzle and probe is delivered to an Anderson impactor 59 which contains a series of plates and orifices (stages) that separate the mist particles according to particle size (cut point) and provide a weight distribution of particles in size ranges that relate to the orifice sizes in the instrument. Impactor 59 is supported on a length of ½" stainless steel pipe 61 which extends through and is welded to a threaded cap 63 that is adapted to be attached to a female threaded access nipple on the side of a process duct or chamber into which the probe is to be inserted for mist loading measurement. The exterior end 65 of pipe 61 is connected by the length of tubing 67 to a vacuum pump 69 via a flow measuring orifice 71, regulating valve 73 and filter 75. A differential manometer 77 is provided to measure pressure drop across the orifice and a static manometer 79 is provided for reference.

FIG. 11 also shows an impinger 81 comprising an isopropanol filler trap 83 contained in an ice bath 85. However, the impinger was not used in the experiment of the present example.

Set forth in Table 1 are the results of tests of this example. Set forth in Table 2 is a compilation of the downstream particle size distributions for the various runs. As demonstrated by the data of these tables, substantial re-entrainment of >3 micron aerosol particles from a single component bed is incurred under the test gas velocity and inlet mist loading conditions. However, the provision of a second fiber bed component comprising a crimped network of knitted wire mesh results in substantial suppression of re-entrainment of >3 micron particles.

TABLE 1

PROTOTYPE EXIT MIST PERFORMANCE

| CASE # | METAL MESH 2nd BED | BED VELOCITY (FT/MIN) | INLET MIST LOAD (MG/ACF) | EXIT MIST LOAD (MG/ACF)* <3μ | EXIT MIST LOAD (MG/ACF)* >3μ | COMMENTS |
|---|---|---|---|---|---|---|
| 1 | Yes - Mfr. A | 500 | 573 | 0.310 | 0.071 | |
| 2 | No | 514 | 545 | 0.670 | 2.908 | Fiber Only - No Mesh Pad |
| 3 | Yes - Mfr. A | 494 | 577 | 0.310 | 0.136 | |
| 4 | Yes - Mfr. A | 375 | 664 | 0.340 | 0.037 | |
| 5 | Yes - Mfr. A | 516 | 533 | 0.252 | 0.084 | |
| 6 | Yes - Mfr. B | 502 | 588 | 0.350 | 0.161 | 6#/CF Mesh Pad Packing Density |
| 7 | Yes - Mfr. B | 474 | 612 | 0.660 | 0.087 | 12#/CF Mesh Pad Packing Density |
| 8 | Yes - Mfr. B | 481 | 560 | 0.430 | 0.054 | 12#/CF Mesh Pad Packing Density |
| 9 | Yes - Mfr. B | 483 | 72 | 0.440 | 0.129 | 12#/CF Mesh Pad Packing Density |
| 10 | Yes - Mfr. B | 503 | 95 | 0.290 | 0.026 | 12#/CF Mesh Pad Packing Density |
| 11 | No | 482 | 81 | 0.470 | 0.076 | Fiber Only - No Mesh Pad |
| 12 | No | 520 | 578 | 0.660 | 2.246 | Fiber Only - No Mesh Pad |

*Data based on summation of data presented in Table 2; (μ = micron)

TABLE 2

| Case No. | Stage | Cut Point Microns | Loadings mg/ACF | Loadings % | Cummulative % |
|---|---|---|---|---|---|
| 1 | 1 | 9.97 | 0.018 | 4.69 | 95.31 |
| | 2 | 6.33 | 0.012 | 3.13 | 92.19 |
| | 3 | 4.20 | 0.035 | 9.38 | 82.81 |
| | 4 | 2.97 | 0.006 | 1.56 | 81.25 |
| | 5 | 1.90 | 0.041 | 10.94 | 70.31 |
| | 6 | 0.98 | 0.018 | 4.69 | 65.63 |
| | 7 | 0.58 | 0.017 | 18.75 | 46.88 |
| | 8 | 0.37 | 0.065 | 17.19 | 29.89 |
| | 9 | | 0.112 | 29.69 | 0.00 |
| | TOTAL | | 0.377 | 100.00 | |
| 2 | 1 | 10.07 | 2.771 | 77.45 | 22.55 |
| | 2 | 6.39 | 0.107 | 2.98 | 19.57 |
| | 3 | 4.25 | 0.000 | 0.00 | 19.57 |
| | 4 | 3.00 | 0.030 | 0.85 | 18.72 |
| | 5 | 1.92 | 0.107 | 2.98 | 15.74 |
| | 6 | 0.99 | 0.122 | 3.40 | 12.34 |
| | 7 | 0.59 | 0.030 | 0.85 | 11.49 |
| | 8 | 0.37 | 0.274 | 7.66 | 3.83 |
| | 9 | | 0.137 | 3.83 | 0.00 |
| | TOTAL | | 3.578 | 100.00 | |
| 3 | 1 | 10.04 | 0.068 | 15.15 | 84.85 |
| | 2 | 6.38 | 0.027 | 6.06 | 78.79 |
| | 3 | 4.24 | 0.034 | 7.57 | 71.21 |
| | 4 | 2.99 | 0.007 | 1.52 | 69.70 |
| | 5 | 1.91 | 0.047 | 10.61 | 59.09 |

TABLE 2-continued

| Case No. | Stage | Cut Point Microns | Loadings mg/ACF | Loadings % | Cummulative % |
|---|---|---|---|---|---|
|  | 6 | 0.99 | 0.054 | 12.12 | 46.97 |
|  | 7 | 0.59 | 0.061 | 13.64 | 33.33 |
|  | 8 | 0.37 | 0.074 | 16.67 | 16.67 |
|  | 9 |  | 0.074 | 16.67 | 0.00 |
|  | TOTAL |  | 0.446 | 100.00 |  |
| 4 | 1 | 10.01 | 0.021 | 5.63 | 94.37 |
|  | 2 | 6.36 | 0.000 | 0.00 | 94.37 |
|  | 3 | 4.22 | 0.011 | 2.82 | 91.55 |
|  | 4 | 2.98 | 0.005 | 1.41 | 90.15 |
|  | 5 | 1.91 | 0.000 | 0.00 | 90.15 |
|  | 6 | 0.99 | 0.074 | 19.72 | 70.43 |
|  | 7 | 0.59 | 0.063 | 16.90 | 53.53 |
|  | 8 | 0.37 | 0.100 | 26.76 | 26.76 |
|  | 9 |  | 0.100 | 26.76 | 0.00 |
|  | TOTAL |  | 0.375 | 100.00 |  |
| 5 | 1 | 10.01 | 0.047 | 14.06 | 85.94 |
|  | 2 | 6.35 | 0.021 | 6.25 | 79.69 |
|  | 3 | 4.22 | 0.011 | 3.12 | 76.57 |
|  | 4 | 2.98 | 0.005 | 1.56 | 75.00 |
|  | 5 | 1.90 | 0.011 | 3.12 | 71.88 |
|  | 6 | 0.99 | 0.021 | 6.25 | 65.63 |
|  | 7 | 0.58 | 0.063 | 18.75 | 46.88 |
|  | 8 | 0.37 | 0.068 | 20.32 | 26.57 |
|  | 9 |  | 0.089 | 26.57 | 0.00 |
|  | TOTAL |  | 0.336 | 100.00 |  |
| 6 | 1 | 10.01 | 0.125 | 24.71 | 75.29 |
|  | 2 | 6.35 | 0.000 | 0.00 | 75.29 |
|  | 3 | 4.22 | 0.006 | 1.17 | 74.12 |
|  | 4 | 2.98 | 0.030 | 5.88 | 68.24 |
|  | 5 | 1.90 | 0.000 | 0.00 | 68.24 |
|  | 6 | 0.99 | 0.083 | 16.47 | 51.77 |
|  | 7 | 0.58 | 0.119 | 23.53 | 28.24 |
|  | 8 | 0.37 | 0.143 | 28.24 | 0.00 |
|  | 9 |  | 0.000 | 0.00 | 0.00 |
|  | TOTAL |  | 0.505 | 100.00 |  |
| 7 | 1 | 10.23 | 0.013 | 1.80 | 98.20 |
|  | 2 | 6.49 | 0.000 | 0.00 | 98.20 |
|  | 3 | 4.32 | 0.040 | 5.40 | 92.79 |
|  | 4 | 3.05 | 0.034 | 4.50 | 88.29 |
|  | 5 | 1.95 | 0.040 | 5.40 | 82.89 |
|  | 6 | 1.01 | 0.034 | 4.50 | 78.38 |
|  | 7 | 0.60 | 0.222 | 29.73 | 48.65 |
|  | 8 | 0.38 | 0.229 | 30.63 | 18.02 |
|  | 9 |  | 0.135 | 18.02 | 0.00 |
|  | TOTAL |  | 0.748 | 100.00 |  |
| 8 | 1 | 10.09 | 0.033 | 6.82 | 93.18 |
|  | 2 | 6.41 | 0.011 | 2.27 | 90.91 |
|  | 3 | 4.26 | 0.005 | 1.14 | 89.78 |
|  | 4 | 3.01 | 0.005 | 1.14 | 88.64 |
|  | 5 | 1.92 | 0.066 | 13.64 | 75.00 |
|  | 6 | 1.00 | 0.060 | 12.51 | 62.50 |
|  | 7 | 0.59 | 0.109 | 22.73 | 39.77 |
|  | 8 | 0.37 | 0.098 | 20.45 | 19.32 |
|  | 9 |  | 0.093 | 19.32 | 0.00 |
|  | TOTAL |  | 0.481 | 100.00 |  |
| 9 | 1 | 10.10 | 0.081 | 14.29 | 85.71 |
|  | 2 | 6.41 | 0.016 | 2.86 | 82.86 |
|  | 3 | 4.26 | 0.016 | 2.86 | 80.00 |
|  | 4 | 3.01 | 0.016 | 2.86 | 77.14 |
|  | 5 | 1.92 | 0.032 | 5.71 | 71.43 |
|  | 6 | 1.00 | 0.081 | 14.29 | 52.14 |
|  | 7 | 0.59 | 0.097 | 17.14 | 40.00 |
|  | 8 | 0.37 | 0.097 | 17.14 | 22.86 |
|  | 9 |  | 0.129 | 22.86 | 0.00 |
|  | TOTAL |  | 0.564 | 100.00 |  |
| 10 | 1 | 10.04 | 0.000 | 0.00 | 100.00 |
|  | 2 | 6.37 | 0.000 | 0.00 | 100.00 |
|  | 3 | 4.24 | 0.000 | 0.00 | 100.00 |
|  | 4 | 2.99 | 0.026 | 8.34 | 91.66 |
|  | 5 | 1.91 | 0.000 | 0.00 | 91.66 |
|  | 6 | 0.99 | 0.000 | 0.00 | 91.66 |
|  | 7 | 0.59 | 0.000 | 0.00 | 91.66 |
|  | 8 | 0.37 | 0.000 | 0.00 | 91.66 |
|  | 9 |  | 0.285 | 91.66 | 0.00 |
|  | TOTAL |  | 0.311 | 100.00 |  |
| 11 | 1 | 10.08 | 0.000 | 0.00 | 100.00 |
|  | 2 | 6.40 | 0.000 | 0.00 | 100.00 |
|  | 3 | 4.25 | 0.000 | 0.00 | 100.00 |
|  | 4 | 3.00 | 0.076 | 13.88 | 86.12 |
|  | 5 | 1.92 | 0.000 | 0.00 | 86.12 |
|  | 6 | 1.00 | 0.000 | 0.00 | 86.12 |
|  | 7 | 0.59 | 0.000 | 0.00 | 86.12 |
|  | 8 | 0.37 | 0.000 | 0.00 | 86.12 |
|  | 9 |  | 0.473 | 86.12 | 0.00 |
|  | TOTAL |  | 0.550 | 100.00 |  |
| 12 | 1 | 10.03 | 2.162 | 74.52 | 25.48 |
|  | 2 | 6.36 | 0.014 | 0.48 | 25.00 |
|  | 3 | 4.23 | 0.028 | 0.96 | 24.04 |
|  | 4 | 2.99 | 0.042 | 1.44 | 22.60 |
|  | 5 | 1.91 | 0.042 | 1.44 | 21.15 |
|  | 6 | 0.99 | 0.112 | 3.85 | 17.31 |
|  | 7 | 0.59 | 0.153 | 5.29 | 12.02 |
|  | 8 | 0.37 | 0.153 | 5.29 | 6.73 |
|  | 9 |  | 0.195 | 6.73 | 0.00 |
|  | TOTAL |  | 2.901 | 100.00 |  |

EXAMPLE 2

Based on the results of the tests described in Example 1, the mist eliminator elements of a commercial fiber bed separator were retrofitted with second fiber beds consisting of knitted wire mesh material. Originally, the commercial elements had consisted only of a single bed of C-mat (nominally 28$\mu$) glass fiber. In providing a second fiber bed for these elements, discrete modular sections of knitted wire mesh material were produced in tubular configuration by spirally winding a web of crimped knitted mesh material along a circumference defined of a diameter sufficient to allow the sections to fit snugly over the outside of the existing C-mat elements. Each section had a height of approximately one-half the height of a commercial element. Two modular sections of the tubular wire mesh material were then fitted over each of the glass fiber elements to provide a composite mist eliminator element adapted for re-entrainment control. The thickness of the wire mesh sections was approximately 2¼".

With the second fiber beds in place on each of the elements, a test was run to determine the effectiveness of the system for controlling discharge of re-entrained sulfuric acid mist from the elements. Samples were taken and analyzed via an Anderson impactor using the apparatus of FIG. 11. Gas flow rates were calculated on the basis of acid production rate, stack oxygen, stack sulfur dioxide, and gas temperature and pressure. Flow rates were also measured by a pitot tube at the stack and the blower inlet of the acid plant. The results of the tests of this examples are set forth in Table 3.

TABLE 3

EXPECTED RESULTS VS. ACTUAL COMMERCIAL PLANT
(FINAL ABSORBING TOWER) RESULTS

|  | EXIT MIST LOAD (MG/ACF) | | TOTAL MIST LOAD (MG/ACF) |
|---|---|---|---|
|  | <3$\mu$ | >3$\mu$ |  |
| I. Mist Eliminator Without Mesh Pads | 0.08 | 1.05 | 1.13 |

TABLE 3-continued

EXPECTED RESULTS VS. ACTUAL COMMERCIAL PLANT
(FINAL ABSORBING TOWER) RESULTS

| | EXIT MIST LOAD (MG/ACF) | | TOTAL MIST LOAD (MG/ACF) |
|---|---|---|---|
| | <3μ | >3μ | |
| II. Expected Results Based on Water Pilot Plant | | | |
| A. Efficiency | | | |
| (74.4%) | 0.08 | 0.27 | 0.35 |
| (97.3%) | 0.08 | 0.03 | 0.11 |
| B. Exit Load Data | | | |
| Worst Case | 0.08 | 0.09 | 0.17 |
| Average Value | 0.08 | 0.06 | 0.14 |
| III. Actual Results (Ref. 2) | | | |
| Sample #11 | 0.09 | 0.13 | 0.22 |
| Sample #12 | 0.1 | 0.14 | 0.24 |
| Sample #13 | 0.1 | 0.15 | 0.25 |
| Sample #14 | 0.11 | 0.2 | 0.31 |
| Sample #15 | 0.1 | 0.22 | 0.32 |
| Average | 0.1 | 0.17[1] | 0.27[2] |

[1] 84% Efficiency Of +3 Micron Particles.
[2] 76% Overall EFficiency.

What is claimed is:

1. A substantially cylindrical mist eliminator bed element for use in removal of liquid aerosols from a moving gas stream by flowing the gas stream through the element, said element comprising: a first fiber bed for collection of aerosol particles, and a second fiber adjacent the fist fiber bed for preventing re-entrainment of liquid in the gas stream, said element being adapted to be oriented with respect to a substantially horizontal flow of aerosol containing gas so that adjacent surfaces of said fiber beds are substantially vertical, and wherein each of said first fiber bed and said second fiber bed are configured as a tube that is substantially concentric with the cylindrical axis; said first fiber bed being upstream of the said second fiber bed with respect to the flow of said gas, said first fiber bed comprising a bed of, fibers having a mean fiber diameter of at least about 10 microns to 50 microns packed to a substantially uniform bed voidage of 85% to 98%, said mean fiber diameter, said bed voidage, and the distribution of fibers in said first bed being such as to provide for collection of the droplets of liquid aerosol from an aerosol containing gas, a horizontal component of movement of collected liquid through said first fiber bed towards the downstream surface of said first fiber bed consequently being imparted by gas phase drag at a design gas velocity, and said second fiber bed having a substantially uniform bed voidage of 95% to 99% and comprising a network of fibers having a mean fiber diameter of between about 100 and about 450 microns, said network comprising a plurality of layers of generally planar knitted wire mesh material containing ridges therein extending from the plane of the weave, thereby creating a space between successive layers so that the voidage of the second fiber beds exceeds the voidage of the knitted mesh material, and wherein the ridges of each of said layers are generally parallel to one another and extend in a direction biased with respect to the direction in which the ridges of an adjacent layer extend; in which said element is used for removal of aerosols from gases at high velocity, the fiber diameter and voidage of said second bed being such that liquid collected from said aerosol in said first fiber bed substantially drains from said second fiber bed without substantial re-entrainment.

2. A mist eliminator bed element as set forth in claim 1 adapted for removal of sulfuric acid mist from a gas stream containing such a mist, wherein said second fiber bed element is comprised of a knit of wire that is constituted of a material selected from the group consisting of 310 stainless steel and Sandvik SX sulfuric acid alloy.

3. A mist eliminator bed element as set forth in claim 1 wherein said second fiber bed is comprised of a plurality of discrete modular sections that are fitted together to form a bed of substantially uniform voidage.

4. A mist eliminator bed element as set forth in claim 3 wherein said second fiber bed comprises plurality of arcuate sections fitted together.

5. A mist eliminator bed element as set forth in claim 4 wherein said element is oriented substantially vertically, said second fiber bed element comprising a plurality of tubular sections stacked one on top of another.

6. A mist eliminator bed element as set forth in claim 5 wherein the direction of gas flow is generally transverse to the plane of the knit.

7. A mist eliminator bed element as set forth in claim 6 wherein said second fiber bed comprises a web of knitted mesh material that is wound in a circumferential spiral about said axis to provide a plurality of wraps which comprise said layers.

8. A mist eliminator bed element as set forth in claim 7 wherein said knitted mesh material contains ridges therein extending from the plane of the weave, thereby creating a space between successive wraps so that the voidage of the second fiber bed exceeds the voidage of the knitted mesh material.

9. A mist eliminator bed element as set forth in claim 8 wherein the ridges of at least one wrap of the knitted material are generally parallel to one another and extend in the direction biased which respect to the direction in which the ridges of a successive wrap extend.

10. A mist eliminator bed element as set forth in claim 1 wherein said second bed is in contact with said first bed so that an interface is formed between the first and second beds, said element being adapted to be oriented with respect to a substantially horizontal flow of aerosol containing gas so that said interface is substantially vertical.

11. A mist eliminator bed element as set forth in any one of claims 1, 2-7 or 10, wherein:
    said first fiber bed comprises a bed of randomly distributed fibers.

12. A substantially cylindrical mist eliminator bed element for use in removal of liquid aerosols from a moving gas stream by flowing the gas stream through the element, said element comprising:

a first fiber bed for collection of aerosol particles, and a second fiber adjacent the first fiber bed for preventing re-entrainment of liquid in the gas stream, said element being adapted to be oriented with respect to a substantially horizontal flow of aerosol containing gas so that adjacent surfaces of said fiber beds are substantially vertical, said first fiber bed being upstream of said second fiber bed with respect to the flow of said gas, said first fiber bed comprising a bed of fibers having a mean fiber diameter of at least about 10 microns packed to a substantially uniform bed voidage of 85% to 98%, said mean fiber diameter, said bed voidage, and the distribution of fibers in said first bed being such as to provide for collection of the droplets of liquid aerosol from an aerosol containing gas, a horizontal component of movement of collected liquid through said first fiber bed toward the downstream surface of said first fiber bed consequently being imparted by gas phase drag at a design gas velocity, and said second fiber bed being a non-matting bed of fibers having a mean fiber diameter of at least about 25 microns packed to a bed voidage from about 85% to 99%, the fiber diameter and voidage of said second bed being such that liquid intercepted from said aerosol in said first fiber bed substantially drains by gravity from said second fiber bed without substantial re-entrainement, each of said first fiber bed and said second fiber bed being configured as a tube that is substantially concentric with the cylindrical axis, said second fiber bed comprising a plurality of tubular sections stacked on one on top of another, each of said sections comprising a web of knitted mesh material that is wound in a circumferential spiral about said axis to provide a plurality of wraps of knitted mesh material, wherein said knitted mesh material contains ridges therein extending from the plane of the knit, thereby creating a space between successive wraps so that the voidage of the second fiber bed exceeds the voidage of the knitted mesh material.

13. A mist eliminator bed as set forth in claim 12 wherein the ridges of at least one wrap of the knitted material are generally parallel to one another and extend in the direction biased which respect to the direction in which the ridges of a successive wrap extend.

14. A mist eliminator bed as set forth in claim 12 wherein the ridges of at least one wrap of the knitted material are in a herringbone pattern.

15. A fiber bed separator for removal of aerosols from a moving gas stream as a liquid phase without substantial re-entrainment of the collected liquid phase, comprising a housing, inlet means for an aerosol containing gas, at least one fiber bed element, outlet means for the collected liquid phase, outlet means for the treated gas stream, and baffle means forcing the aerosol containing gas stream to pass through each of said at least one said fiber bed elements, each of said at least one fiber bed element being substantially cylindrical and comprising:

a first fiber bed for collection of aerosol particles, and a second fiber adjacent the first fiber bed for preventing re-entrainment of liquid in the gas stream, said element being adapted to be oriented with respect to a substantially horizontal flow of aerosol containing gas so that adjacent surfaces of said fiber beds are substantially vertical, and wherein each of said first fiber bed and said second fiber bed are configured as a tube that is substantially concentric with the cylindrical axis; said first fiber bed being upstream of the said second fiber bed with respect to the flow of said gas stream, said first fiber bed comprising a bed of fibers having a mean fiber diameter of at least about 10 microns to 50 microns packed to a substantially uniform bed voidage of 85% to 98%, said mean fiber diameter, said bed voidage, and the distribution of fibers in said first bed being such as to provide for collection of the droplets of liquid aerosol from an aerosol containing gas, a horizontal component of movement of collected liquid through said first fiber bed towards the downstream surface of said first bed consequently being imparted by gas phase drag at a design gas velocity, and said second fiber bed having a substantially uniform bed voidage of 95% to 99% and comprising a network of fibers having a mean fiber diameter of between about 100 and about 450 microns, said network comprising a plurality of layers of generally planar knitted wire mesh material containing ridges therein extending from the plane of the weave, thereby creating a space between successive layers so that the voidage of the second fiber bed exceeds the voidage of the knitted mesh material, and wherein the ridges of each of said layers are generally parallel to one another and extend in a direction biased with respect to the direction in which the ridges of an adjacent layer extend; in which said element is used for removal of aerosols from gases at high velocity, the fiber diameter and voidage of said second bed being such that liquid collected from said aerosol in said first fiber bed substantially drains from said second fiber bed without substantial re-entrainment.

16. A fiber bed separator as set forth in claim 15 wherein said second bed is in contact with said first bed so that an interface is formed between the first and second beds, said element being adapted to be oriented with respect to a substantially horizontal flow of aerosol containing gas so that said interface is substantially vertical.

17. A fiber bed separator as set forth in claim 15 adapted for removal of sulfuric acid mist from a gas stream containing such a mist, wherein said second fiber bed element is comprised of a knitted wire bed of fibers that are constituted of a material selected from the group consisting of 310 stainless steel and Sandvik SX sulfuric acid alloy.

18. A fiber bed separator as set forth in claim 15 wherein said second fiber bed is comprised of a plurality of discrete sections that are fitted together to form a bed of substantially uniform voidage.

19. A fiber bed separator as set forth in claim 18 wherein said second fiber bed comprises a plurality of arcuate sections fitted together.

20. A fiber bed separator as set forth in claim 19 wherein said element is oriented substantially vertically, said second fiber bed element comprising a plurality of tubular sections stacked one on top of another.

21. A fiber bed separator as set forth in claim 20 the direction of gas flow is generally transverse to the plane of the knit.

22. A fiber bed separator as set forth in claim 21 wherein said second fiber bed comprises a web of knitted mesh material that is wound in a circumferential spiral about said axis to provide a plurality of wraps which comprise said layers.

23. A fiber bed separator as set forth in any one of claims 15, 17–22, or 16, wherein:
said first fiber bed comprises a bed of randomly distributed fibers.

24. A fiber bed separator for removal of aerosols from a moving gas stream as a liquid phase without substantial re-entrainment of the collected liquid phase, comprising inlet means for an aerosol containing gas, at least one fiber bed element, outlet means for the collected liquid phase, outlet means for the treated gas stream, and baffle means forcing the aerosol containing gas stream to pass through each of said at least one said fiber bed elements, each of said at least one fiber bed element being substantially cylindrical comprising:
a first fiber bed for collection of aerosol particles, and a second fiber adjacent the first fiber bed for preventing re-entrainment of liquid in the gas stream, said element being adapted to be oriented with respect to a substantially horizontal flow of aerosol containing gas so that adjacent surfaces of said fiber beds are substantially vertical, and wherein each of said first fiber bed and said second fiber bed are configured as a tube that is substantially concentric with the cylindrical axis; said first fiber bed being upstream of the said second fiber bed with respect to the flow of said gas stream,
said first fiber bed comprising a bed of fibers having a mean fiber diameter of at least about 10 microns to 50 microns packed to a substantially uniform bed voidage of 85% to 98%, said means fiber diameter, said bed voidage, and the distribution of fibers in said first bed being such as to provide for collection of the droplets of liquid aerosol from an aerosol containing gas, a horizontal component of movement of collected liquid through said first fiber bed towards the downstream surface of said first bed consequently being imparted by gas phase drag at a design velocity, and
said second fiber bed having a substantially uniform bed voidage of 95% to 99% and comprising a network of fibers having a mean fiber diameter of between about 100 and about 450 microns, said fibers of said network comprising a plurality of layers of generally planar knitted mesh wire material containing ridges therein extending from the plane of the weave, thereby creating a space between successive layers so that the voidage of the second fiber bed exceeds the voidage of the knitted meash material, and wherein the ridges are in a generally herringbone pattern;
the fiber diameter and voidage of said second bed being such that liquid collected from said aerosol in said first fiber bed substantially drains from said second fiber bed without substantial re-entrainment.

25. A fiber bed separator as set forth in claim 24 wherein said second bed is in contact with said first bed so that an interface is formed between the first and second beds, said element being adapted to be oriented with respect to substantially horizontal flow of aerosol containing gas so that said interface is substantially vertical.

26. A fiber bed separator as set forth in claim 24 adapted for removal of sulfuric acid mist from a gas stream containing such a mist, wherein said second fiber bed element is comprised of a knitted wire bed of fibers that are constituted of a material selected from the group consisting of 310 stainless steel Sandvik SX sulfuric acid alloy.

27. A fiber bed separator as set forth in claim 24 wherein said second fiber bed is comprised of a plurality of discrete sections that are fitted together to form a bed of substantially uniform voidage.

28. A fiber bed separator as set forth in claim 27 wherein said second fiber bed comprises a plurality of arcuate sections fitted together.

29. A fiber bed separator as set forth in claim 28 wherein said element is oriented substantially vertically, said second fiber bed element comprising a plurality of tubular sections stacked one on top of another.

30. A fiber bed separator as set forth in claim 24 wherein the direction of gas flow is generally transverse to the plane of the knit.

31. A fiber bed separator as set forth in claim 30 wherein said second fiber bed comprises a web of knitted mesh material that is wound in circumferential spiral about said axis to provide a plurality of wraps which comprise said layers.

32. A fiber bed separator as set forth in any one of claim 14–25, said first fiber bed comprises a bed of randomly distributed fibers.

33. A process for removing aerosols of less than 3 microns from a moving gas stream in a fiber bed separator wherein said aerosol containing gas is caused to flow substantially horizontally through a bed of fibers having a mean diameter of at least about 10 microns to 50 microns and packed to a substantially uniform bed voidage from about 85% to about 99%, resulting in separation of a substantial proportion of the aerosol from the gas as a collected liquid phase, an improvement whereby re-entrainment of said liquid phase from the downstream surface of said fiber bed is substantially prevented, said improvement comprising:

providing a second fiber bed adjacent said first fiber bed, adjacent surfaces of said fiber beds being substantially vertical and wherein each of said first fiber bed and said second fiber bed are configured as a tube that is substantially concentric with the cylindrical axis;

causing said aerosol containing gas to flow through said first fiber bed at a velocity that effects collection of the liquid aerosol, consequently imparting a horizontal component of movement of collected liquid through said first fiber bed toward the downstream surface of said first fiber bed due to gas phase drag; and continuing the substantially horizontal flow of said gas, now substantially free of aerosol particles, through said second fiber bed, said second fiber bed having a substantially uniform bed voidage of 95% to 99% and comprising a network of fibers having a mean fiber diameter between about 100 and about 450 microns, said network comprising a plurality of layers of generally planar knitted wire mesh material containing ridges therein extending from the plane of the weave, thereby creating a space between successive layers so that the voidage of the second fiber bed exceeds the voidage of the knitted mesh material, and wherein the ridges of each of said layers are generally parallel to one another and extend in a direction biased with respect to the direction in which the ridges of an adjacent layer extend; the fiber diameter and voidage of said second bed being such that liquid collected from the aerosol in said first fiber bed substantially drains from said second fiber bed without substantial re-entrainment.

34. A process as set forth in claim 33 wherein sulfuric acid mist is removed from a gas stream containing such mist, said second fiber bed being comprised of a knitted wire bed of fibers that are constituted of a material selected from the group consisting of 310 stainless steel and Sandvik SX sulfuric acid alloy.

35. A process as set forth in claim 33 wherein said second fiber bed is comprised of a plurality of discrete sections that are fitted together to form a bed of substantially uniform voidage.

36. A process as set forth in claim 35 wherein said said second fiber bed element comprises a plurality of arcuate sections fitted together.

37. A process as set forth in claim 36 wherein said element is oriented substantially vertically, said second fiber bed comprising a plurality of annular cylindrical sections stacked one on top of another.

38. A process as set forth in claim 33 wherein the direction of gas flow is generally transverse to the plane of the knit.

39. A process as set forth in claim 38 wherein said second fiber bed comprises a web of knitted mesh material that is wound in a circumferential spiral about said axis to provide a plurality of wraps which comprise said layers.

40. A process as set forth in any one claims 33 and 34-39, wherein said second bed is in contact with said first bed so that an interface is formed between the first and second beds, said element being adapted to be oriented with respect to a substantially horizontal flow of aerosol containing gas so that said interface is substantially vertical.

41. A process for removing aerosols of less than 3 microns from a moving gas stream in a fiber bed separator wherein said aerosol containing gas is caused to flow substantially horizontally through a bed of fibers having a mean diameter of at least about 10 microns to 50 microns and packed to a substantially uniform bed voidage from about 85% to about 99%, resulting in separation of a substantial proportion of the aerosol from the gas as a collected liquid phase, an improvement whereby re-entrainment of said liquid phase from the downstream surface of said fiber bed is substantially prevented, said improvement comprising:

providing a second fiber bed adjacent said first fiber bed, adjacent surfaces of said fiber beds being substantially vertical and wherein each of said first fiber bed and said second fiber bed are configured as a tube that is substantially concentric with the cylindrical axis;

causing said aerosol containing gas to flow through said first fiber bed at a velocity that effects collection of the liquid aerosol, consequently imparting a horizontal component of movement of collected liquid through said first fiber bed toward the downstream surface of said first fiber bed due to gas phase drag; and continuing the substantially horizontal flow of said gas, now substantially free of aerosol particles, through said second fiber bed, said second fiber bed having a substantially uniform bed voidage of 95% to 99% and comprising a network of fibers having a mean fiber diameter between about 100 and about 450 microns, said fibers of said network comprising a plurality of layers of generally planar knitted wire mesh material containing ridges therein extending from the plane of the weave, thereby creating a space between successive layers so that the voidage of the second fiber bed exceeds the voidage of the knitted mesh material, and wherein the ridges are in a herringbone pattern;

the fiber diameter and voidage of said second fiber bed being such that liquid collected from said aerosol in said first fiber bed substantially drains from said second fiber bed without substantial re-entrainment.

42. A process as set forth in claim 41 wherein sulfuric acid mist is removed from a gas stream containing such mist, said second fiber bed being comprised of a knitted wire bed of fibers that are constituted of a material selected from the group consisting of 30 stainless steel and Sandvik SX sulfuric acid alloy.

43. A process as set forth in claim 41 wherein said second fiber bed is comprised of a plurality of discrete sections that are fitted together to form a bed of substantially uniform voidage.

44. A process as set forth in claim 43, wherein said second fiber bed element comprises a plurality of arcuate sections fitted together.

45. A process as set forth in claim 44 wherein said element is oriented substantially vertically, said second fiber bed comprising a plurality of annular cylindrical sections stacked one on top of another.

46. A process as set forth in claim 45 wherein the direction of gas flow is generally transverse to the plane of the knit.

47. A process as set forth in claim 46 wherein said second fiber bed comprises a web of knitted mesh material that is wound in a circumferential spiral about said axis to provide a plurality of wraps which comprise said layers.

48. A process as set forth in any one of claims 41-47 wherein said second bed is in contact with said first bed so that an interface is formed between the first and second beds, said element being adapted to be oriented with respect to a substantially horizontal flow of aerosol containing gas so that said interface is substantially vertical.

* * * * *